(12) United States Patent
Sanford et al.

(10) Patent No.: US 11,161,793 B2
(45) Date of Patent: Nov. 2, 2021

(54) MEDIAN BARRIER FINISHING MACHINE

(71) Applicant: Sanford-Meyer, LLC, Madison, GA (US)

(72) Inventors: Elmore Starr Sanford, Atlanta, GA (US); David Dwight Meyer, Atlanta, GA (US)

(73) Assignee: Sanford-Meyer, LLC, Madison, GA (US)

( * ) Notice: Subject to any disclaimer, the term of this patent is extended or adjusted under 35 U.S.C. 154(b) by 0 days.

(21) Appl. No.: 16/598,114

(22) Filed: Oct. 10, 2019

(65) Prior Publication Data
US 2020/0115292 A1    Apr. 16, 2020

Related U.S. Application Data

(60) Provisional application No. 62/744,808, filed on Oct. 12, 2018.

(51) Int. Cl.
*E01C 19/48*      (2006.01)
*C04B 41/72*      (2006.01)
(Continued)

(52) U.S. Cl.
CPC .............. *C04B 41/72* (2013.01); *B05B 12/32* (2018.02); *B05B 16/80* (2018.02); *B28B 11/04* (2013.01); *B28B 11/046* (2013.01); *B28B 11/048* (2013.01); *B28B 11/08* (2013.01); *B28B 11/0845* (2013.01); *B28B 11/12* (2013.01); *C04B 40/02* (2013.01); *C04B 41/0072* (2013.01); *C04B 41/45* (2013.01);
(Continued)

(58) Field of Classification Search
CPC ......... B05B 12/32; B05B 16/80; B28B 11/04; B28B 11/046; B28B 11/048; B28B 11/08; B28B 11/0845; B28B 11/12; C04B 41/0072; C04B 41/02; C04B 41/45; C04B 41/5346; C04B 41/61; C04B 41/72; E01C 19/004; E01C 19/48; E01C 19/4806; E01C 19/4866; E01C 19/4893; E01F 15/083
USPC ....................................... 404/6, 72, 101, 105
See application file for complete search history.

(56) References Cited

U.S. PATENT DOCUMENTS 3,497,579 A * 2/1970 Barron ..................... E04G 11/26
                                                                    264/33
3,792,133 A * 2/1974 Goughnour ......... E01C 19/4893
                                                                    264/33

(Continued)

*Primary Examiner* — Raymond Waddie
(74) *Attorney, Agent, or Firm* — Thomas | Horstemeyer, LLP

(57) ABSTRACT

Various embodiments for a median barrier finishing machine are described. A median barrier finishing machine may include a housing configured to encapsulate at least a portion of a median barrier, where the housing comprises a first vertical wall, a second vertical wall, and a horizontal wall. The median barrier finishing machine may include at least one adjustable member configured to couple the housing to the vehicle and retain the housing a predetermined distance relative to the vehicle while the vehicle is in motion. Further, the median barrier finishing machine may include at least one finishing device disposed within the housing, where the at least one finishing device is configured to contact a surface of a median barrier at least partially positioned within the housing and treat the surface as the vehicle moves the housing along a length of the median barrier.

9 Claims, 7 Drawing Sheets

(51) Int. Cl.

| | |
|---|---|
| *C04B 41/53* | (2006.01) |
| *C04B 41/45* | (2006.01) |
| *C04B 40/02* | (2006.01) |
| *C04B 41/61* | (2006.01) |
| *C04B 41/00* | (2006.01) |
| *B05B 16/80* | (2018.01) |
| *B28B 11/04* | (2006.01) |
| *B28B 11/12* | (2006.01) |
| *B28B 11/08* | (2006.01) |
| *B05B 12/32* | (2018.01) |
| *E01C 19/00* | (2006.01) |
| *E01F 15/08* | (2006.01) |

(52) U.S. Cl.
CPC .......... *C04B 41/5346* (2013.01); *C04B 41/61* (2013.01); *E01C 19/004* (2013.01); *E01C 19/48* (2013.01); *E01C 19/4806* (2013.01); *E01C 19/4866* (2013.01); *E01C 19/4893* (2013.01); *E01F 15/083* (2013.01)

(56) References Cited

U.S. PATENT DOCUMENTS

| | | | |
|---|---|---|---|
| 3,981,603 A | 9/1976 | Sprunger | |
| 4,266,917 A | 5/1981 | Godbersen | |
| 4,793,559 A | 12/1988 | Marlek | |
| 5,173,309 A | 12/1992 | Belarde | |
| 5,290,492 A | 3/1994 | Belarde | |
| 5,533,888 A | 7/1996 | Belarde | |
| 5,616,291 A | 4/1997 | Belarde | |
| 6,709,195 B2 | 3/2004 | Piccoli et al. | |
| 6,923,630 B2* | 8/2005 | Allen | B28B 11/08 425/101 |
| 7,172,364 B1 | 2/2007 | Nicholson | |
| 8,317,502 B1* | 11/2012 | Grey | E01F 15/083 425/63 |
| 8,920,070 B2 | 12/2014 | Zimmermann et al. | |
| 9,163,366 B2 | 10/2015 | Zimmermann et al. | |
| 2005/0238745 A1 | 10/2005 | Allen | |
| 2020/0208357 A1* | 7/2020 | Engels | E01C 19/004 |

* cited by examiner

MEDIAN BARRIER FINISHING MACHINE

CROSS-REFERENCE TO RELATED APPLICATION

This application claims the benefit of and priority to U.S. Provisional Application No. 62/744,808 entitled "MEDIAN BARRIER FINISHING MACHINE," filed Oct. 12, 2018, the contents of which being incorporated by reference in their entirety herein.

BACKGROUND

Slip forming refers to a process in which concrete is shaped through a continuous pouring of concrete. Molds are used to shape the concrete into the desired form as it is poured. Once the slip forming process has been performed, finishing processes are completed on the uncured concrete surfaces to finalize the median, barrier, or wall. These processes include screeting, floating, or otherwise smoothing the surface; cutting, grooving, or otherwise removing material to form a joint or groove; applying a brush-like texture; and applying a curing compound to the surface or surfaces. These finishing processes are completed manually using handheld tools or equipment. These finishing operations are time consuming and costly to perform.

SUMMARY OF THE INVENTION

Various embodiments for a median barrier finishing machine are described. A median barrier finishing machine may include a housing configured to encapsulate at least a portion of a median barrier, where the housing comprises a first vertical wall, a second vertical wall, and a horizontal wall. The median barrier finishing machine may include at least one adjustable member configured to couple the housing to the vehicle and retain the housing at a predetermined distance and a predetermined angle relative to the vehicle or a ground surface, for instance, while the vehicle is in motion. Further, the median barrier finishing machine may include at least one finishing device disposed within the housing, where the at least one finishing device is configured to treat a surface of a median barrier at least partially positioned within the housing, for instance, as the vehicle moves the housing along a length of the median barrier.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to treatment of median barriers using an apparatus that may be coupled to a vehicle or other moving object. As noted above, manual methods for applying a design to a median, barrier, or other vertical wall are known and used. In addition, methods for applying these aforementioned processes to a horizontal surface are also known and used. However, no process or method exists for smoothing, grooving, or adding a joint; brushing; and applying a finishing compound to the generally vertical wall. The equipment used for a horizontal surface cannot be used for a generally vertical wall.

According to various embodiments of the present disclosure, an attachment referred to as a median barrier finishing machine may be coupled to a vehicle that performs various operations as the vehicle travels along the length of wall, such as a recently slipformed wall. In some embodiments, the vehicle may be the same as a vehicle that created the slipformed wall or other vehicle. Alternatively, the median barrier finishing machine may be integral with a vehicle. As the vehicle travels along the length of the wall, finishing operations may be completed to finalize the wall.

Finishing operations may include, for example, screeting, floating, or otherwise smoothing the surface; cutting, grooving, or otherwise removing material to form a joint or groove in the wall; applying a brush-like texture or pattern; and applying, spreading, spraying a curing compound onto the surface or surfaces, or other operation as will be described. The operations may be performed with tools or other apparatuses mounted or otherwise attached to a substructure of the median barrier finishing machine. The substructure may include a component mounted or otherwise attached to an interior surface of a housing. The housing may in turn be mounted to a frame of a vehicle using one or more members, welds, bolts, or other suitable coupling mechanism. In embodiments in which members are employed, the members may have the ability to telescope or otherwise move laterally, horizontally, or vertically with respect to a plane that is perpendicular to the profile of the wall through use of a power system.

While various embodiments described herein refer specifically to a median barrier, the present disclosure is not so limited. For instance, the embodiments described herein may be employed for treatment of other wall-shaped or vertical surfaces, whether formed of concrete, brick, metal, or other material.

Figure 1:
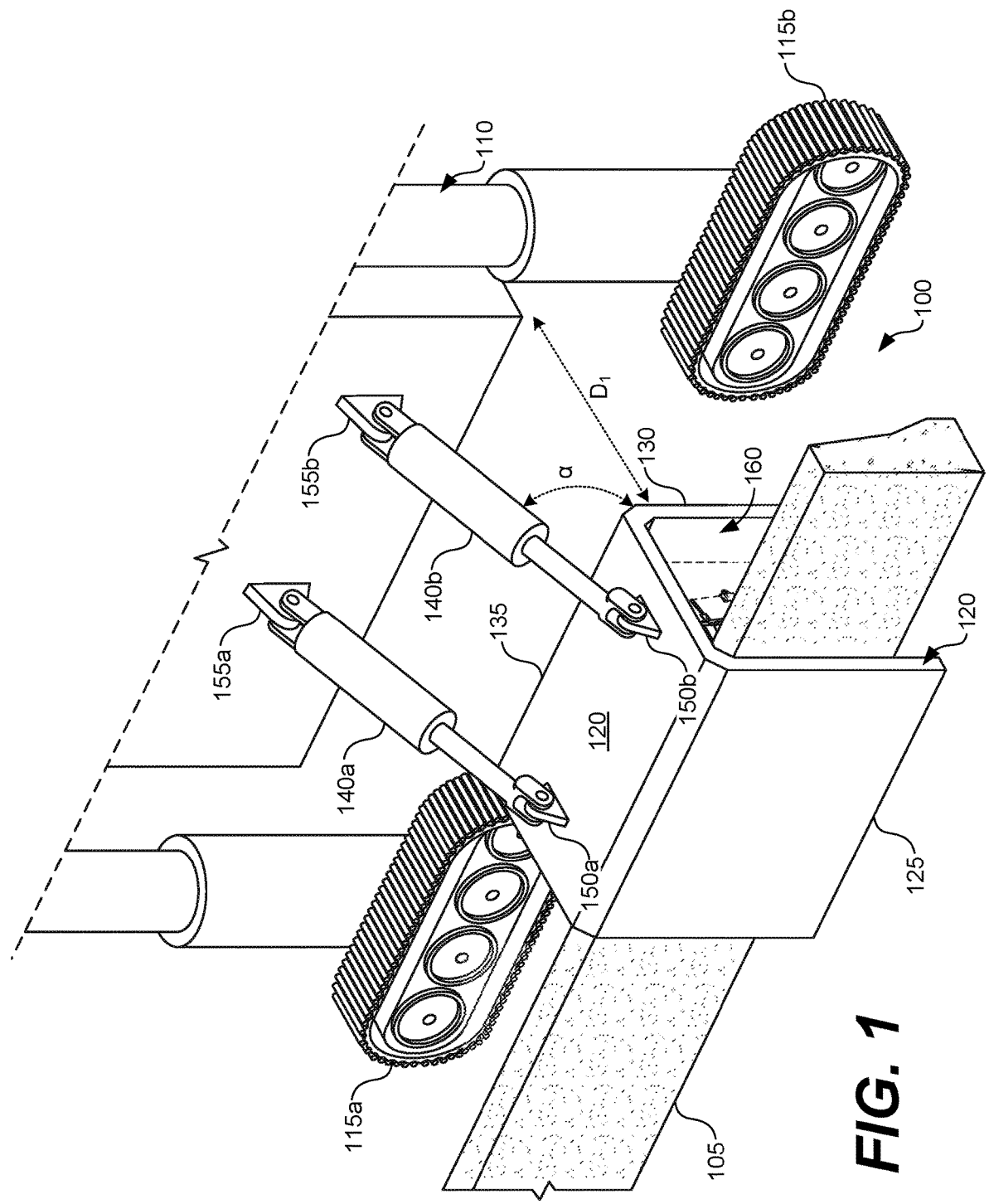
FIG. 1 is a perspective view of an embodiment of a median barrier finishing machine coupled to a vehicle according to various embodiments of the present disclosure.

Referring now to FIG. 1, an example of an embodiment of a median barrier finishing machine 100 is shown according to various embodiments. The median barrier finishing machine 100 may be employed to treat, spray, or otherwise come into contact with a median barrier 105 or other surface. To this end, the median barrier finishing machine 100 may be configured to attach to a vehicle 110 or other moving body, such as a sled or trailer that may be pulled behind a vehicle. As the vehicle 110 is navigated or otherwise moved along a length of the median barrier 105 or other surface, the median barrier finishing machine 100 may perform one or more treatments to the median barrier 105, as will be described. In some embodiments, the median barrier 105 is formed of concrete, rebar, or other material.

The vehicle 110 may include a truck, a construction vehicle, a steam roller, a sled that may be automatically or manually controlled, or other vehicle as may be appreciated. As such, the vehicle 110 may include a plurality of tracks 115a, 115b (collectively "tracks 115"), wheels, tires, or other objects that facilitate movement of the vehicle 110 and the median barrier finishing machine 100. In some embodiments, the median barrier finishing machine 100 is positioned laterally or, in other words, on a side of the vehicle 110; however, in alternative embodiments, the median barrier finishing machine 100 may be pulled behind a vehicle 110 using a trailer, sled, or similar device.

The median barrier finishing machine 100 may include a housing 120 or similar enclosure as may be appreciated. The housing 120 may retain, hold, mount, or otherwise support substructure and other components, as will be discussed, which may be attached or supported by the substructure. The enclosure may also protect the vehicle 110 and any mounting structure from debris including concrete, curing compound, rocks, or other foreign objects.

In various embodiments, the housing 120 may be sized and positioned to encapsulate at least a portion of the median barrier 105. As such, in some embodiments, the housing 120 may include a first vertical wall 125, a second vertical wall 130, and a horizontal wall 135 that may be positioned on each side of the median barrier 105. As shown in FIG. 1, the horizontal wall 135 may couple the first vertical wall 125 to the second vertical wall 130. Also shown in FIG. 1, the first vertical wall 125 and the second vertical wall 130 may be positioned on opposing surfaces of the median barrier 105, whereas the horizontal wall 135 may be positioned above a top surface of the median barrier 105.

The housing 120 may be coupled to the vehicle 110 using one or more members 140 that retain the housing 120 a predetermined distance $D_1$ and a predetermined angle α relative to the vehicle 110, for instance, while the vehicle is stationary or in motion. In some embodiments, the housing 120 is coupled to the vehicle 110 using one or more adjustable members 140a, 140b (collectively "adjustable members 140"). In some embodiments, the adjustable members 140 are configured to move laterally, horizontally, or vertically with respect to a plane perpendicular to a profile of the median barrier 105. For instance, the adjustable members 140 may include telescoping arms. As may be appreciated, the adjustable members 140 may be configured to move laterally, horizontally, or vertically through use of a mechanical system, an electrical system, a pneumatic system, a hydraulic system, or a combination thereof. In some embodiments, movement of the adjustable members 140 is overseen by a control circuit that maintains the position of the housing 120 relative to the sides of the median barrier 105.

In some embodiments, the adjustable members 140 include actuators accompanied with guiding members. The guiding members may assist in locating, orienting, and generally aiding in correct positioning of the housing 120, and its internal components, relative to a surface of the median barrier 105.

A control circuit (not shown) may be positioned within or near the median barrier finishing machine 100 or the vehicle 110 to oversee operation of the adjustable members 140. The control circuit may be used to adjust the predetermined distance $D_1$ and the predetermined angle α, for example, by communicating with an electrical or electromechanical controller, a hydraulic controller, a pneumatic controller, or other controller, as may be appreciated. The control circuit may include one or more microprocessors or other computing devices comprising, for instance, a hardware processor, a data bus, memory, and program instructions stored thereon that direct operation of the microprocessor or other computing device. In some embodiments, operation of the control circuit may be directed by a smartphone, a tablet, a laptop, a personal computer, a handheld controller integrated into controller of the vehicle 110, or other client device that may be configured to communicate with a controller of the adjustable members 140 wirelessly or through wired communications.

A first distal end of the adjustable members 140 may be coupled to the housing 120 via one or more housing brackets 150a, 150b (collectively "housing brackets 150"). Similarly, a second distal end of the adjustable members 140 may be coupled to the vehicle 110 via one or more vehicle brackets 155a, 155b (collectively "vehicle brackets 155"). Further, the housing 120 may include an interior 160 defined by the first vertical wall 125, the second vertical wall 130, and the horizontal wall 135 in which the median barrier 105 may be positioned.

In various embodiments, the vehicle 110 may provide at least one of electrical power, pneumatic pressure, hydraulic pressure, or other similar resource to the median barrier finishing machine 100 to assist in operations. In some embodiments, the median barrier finishing machine 100 may be pulled by a vehicle 110 that pours the median wall 105 through use of a cable, chain, or other similar linkage. In this scenario, the median barrier finishing machine 100 would still receive power (electrical, hydraulic, pneumatic, etc.) from the vehicle 110, but would be supported by its own wheels or tracks (not shown). For instance, the median barrier finishing machine 100 can include wheels or tracks (not shown), for instance, positioned below the first vertical wall 125 and/or the second vertical wall 130.

Turning now to FIGS. 2-6, side elevation views of various embodiments of the median barrier finishing machine 100 are shown according to various embodiments of the present disclosure. The median barrier finishing machine 100 may include one or more finishing devices 165a . . . 165n (collectively "finishing devices 165") disposed (or at least partially disposed) within the housing 120. The one or more finishing devices 165 may be configured to contact a surface of the median barrier 105, for instance, when the median barrier 105 is at least partially positioned within the housing 120. Contacting a surface of the median barrier 105 may include, for instance, causing a component, such as a roller, to physically touch the median barrier 105. In other embodiments, contacting a surface of the median barrier 105 may include applying heat to the surface or spraying a liquid, foam, or other item on the median barrier 105. As such, "contacting a surface" of the median barrier 105 may include causing another object, such as a liquid, to contact the surface. To this end, the median barrier 105 and its surface may be treated as the vehicle 110 or other moving body traverses the housing 120 along a length of the median barrier 105.

In some embodiments, the one or more of the finishing devices 165 of the median barrier finishing machine 100 may be configured to perform at least one of: scraping the surface of the median barrier 105; floating the surface of the median barrier 105; smoothing the surface of the median barrier 105; cutting the surface of the median barrier 105 or otherwise forming a groove in the median barrier 105; applying a texture, painting, applying a protective compound, or patterning on the surface of the median barrier 105; spraying a curing or a hardening compound on the surface of the median barrier 105; and drying or otherwise applying heat to the median barrier 105. As such, the one or more finishing devices 165 may include a roller, a sprayer, a heater, a blade, a sander, a concrete floater, a brush, a screed plate, a broom, or a combination thereof.

Figure 2:
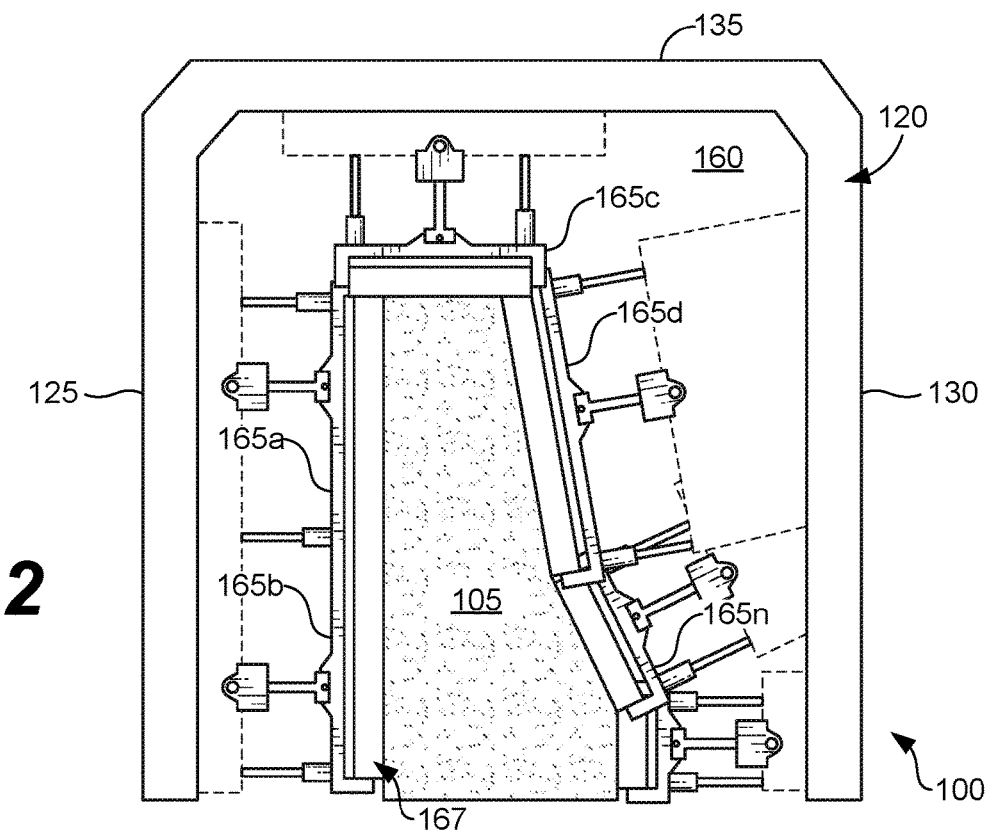
FIG. 2 is a side elevation view of an embodiment of a median barrier finishing machine according to various embodiments of the present disclosure.
Figure 3:
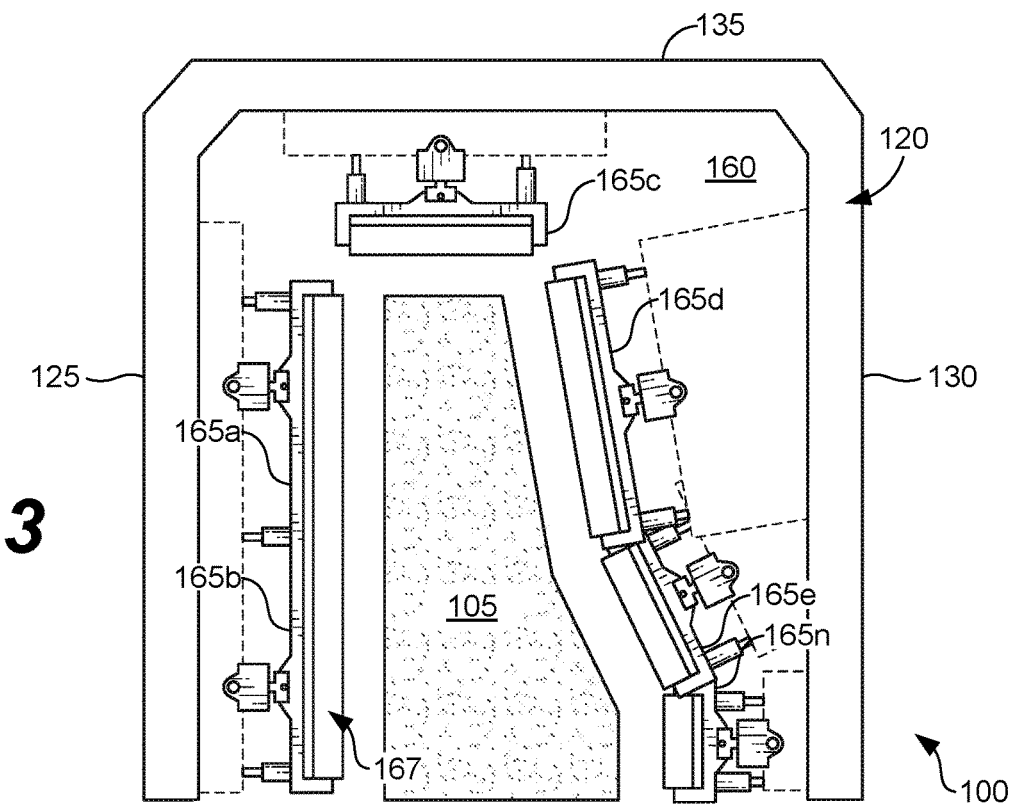
FIG. 3 is another side elevation view of an embodiment of a median barrier finishing machine according to various embodiments of the present disclosure.

For instance, in FIG. 2 and FIG. 3, an example of a plurality of finishing devices 165 are shown. The finishing devices 165 include rollers 167 that may be coupled to an interior surface of the housing 120. For instance, to perform screeting, floating, or smoothing processes, a roller 167 or roller-like system may be employed. A roller 167 or roller system may roll, vibrate, dampen, or otherwise smooth the surface of the median barrier 105. Multiple rollers or roller systems may be used concurrently or in succession to provide desired surface smoothness. Rollers 167 or roller systems may be positioned vertically in the housing 120 or angled with a leading edge nearest the direction of travel of the vehicle 110. Rollers 167 or roller systems may be positioned on both ends of the housing 120 or on a single end, as may be appreciated.

The finishing devices 165, such as the rollers 167 shown in FIGS. 2 and 3, may extend outward until they come into contact with the surface of the median barrier 105. In additional embodiments, the rollers 167 may be employed to apply a coating, such as a paint or a liquid polymer that smooths, seals, or otherwise treats the median barrier 105, which may improve its aesthetic appearance or structural integrity.

In some embodiments, the median barrier finishing machine 100 includes a pump (not shown) to facilitate spraying a curing compound or other liquid. Further, in some embodiments, water or other liquid may be sprayed from a tank via the pump, lines, and nozzles onto the finishing devices 165 or other components of the median barrier finishing machine 100 for cleaning and/or onto the median barrier 105 to slick the surface to facilitate finishing.

As shown in FIG. 2 and FIG. 3, the median barrier 105 may be non-symmetrical. For example, in the disclosed instance, a base portion of the median barrier 105 positioned on the ground is wider than a top portion. As such, placement of the finishing devices 165 may be configured based on the shape or cross-section of the median barrier 105. The median barrier finishing machine 100 may include a finishing device 165 configured to contact a respective linear surface of the median barrier 105, as illustrated in FIGS. 2 and 3.

Notably, in FIG. 3, the finishing devices 165 are shown in a non-operational state where the finishing devices 165 are not in contact with the median barrier 105. As may be appreciated, the non-operational state may be useful during transport of the median barrier finishing machine 100. Conversely, in FIG. 2, the finishing devices 165 are shown in an operational state. As the vehicle 110 or other moving body coupled to the median barrier finishing machine 100 moves along a path parallel to a path of the median barrier 105, the finishing devices 165 will treat the surface or other portion of the median barrier 105.

Like the adjustable members 140, the finishing devices 165 may be configured to move laterally, horizontally, or vertically through use of a mechanical system, an electrical system, a pneumatic system, a hydraulic system, or a combination thereof. For instance, the control circuit may oversee operation of the finishing devices 165 by adjusting a distance of a respective one of the finishing devices 165 from the median barrier 105 or an angle of the respective one of the finishing devices 165 relative to the median barrier 105. The mechanical system can include, for example, turnbuckles, threaded rods, gas struts, springs, and other traditional components as can be appreciated.

Further, the finishing devices 165 may be configured and positioned based on different shapes and sizes of the median barrier 105. In some embodiments, operation of the finishing devices 165 may be directed by a smartphone, a tablet, a laptop, a personal computer, a controller (e.g., a handheld controller or dashboard-mounted controller) integrated into controls of the vehicle 110, or other client device that may be configured to communicate with a controller of the finishing devices 165 wirelessly or through wired communications.

Figure 4:
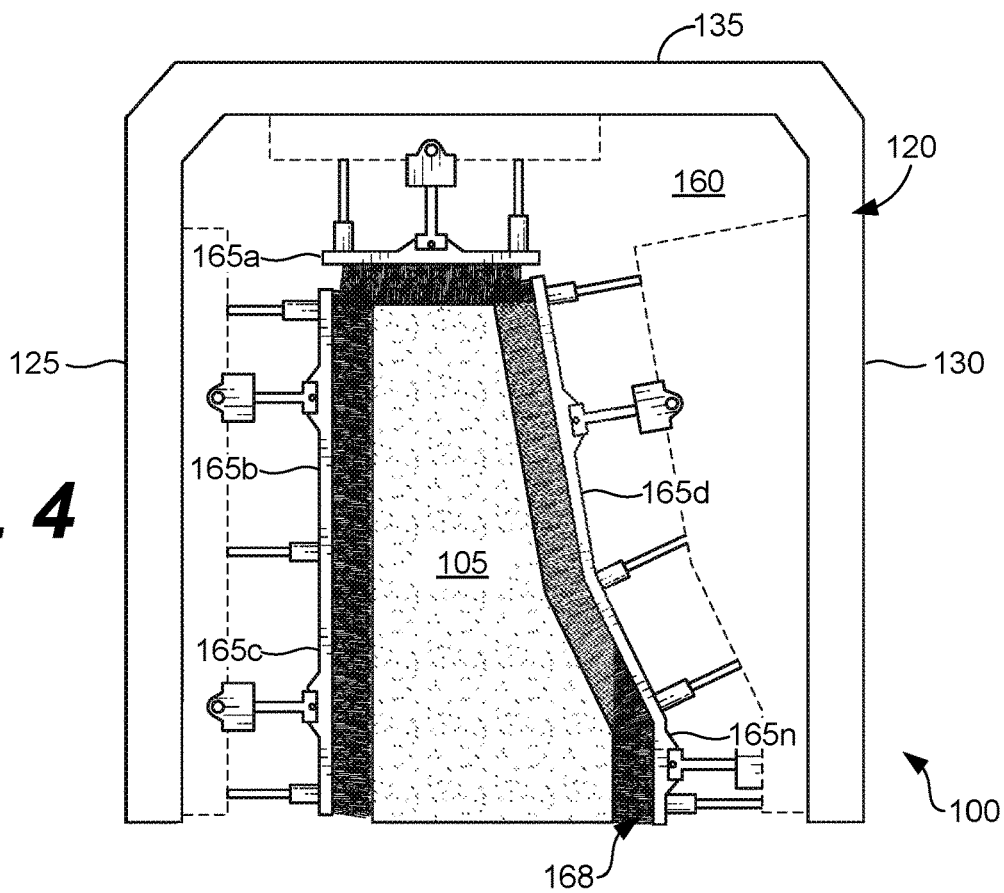
FIG. 4 is another side elevation view of an embodiment of a median barrier finishing machine according to various embodiments of the present disclosure.

Moving along to FIG. 4, another embodiment of the median barrier finishing machine 100 is shown comprising another example type of finishing devices 165. In various embodiments, the finishing devices 165 may include brushes 168 that may be coupled to an interior surface of the housing 120. Multiple brushes 168 or brush systems may be used concurrently or in succession to provide a desired surface finish. Brushes 168 or brush systems may be positioned vertically within the housing 120 or angled with leading edge nearest the direction of travel of the vehicle 110 in some embodiments. The brushes 168 can include brooms in some embodiments. Further, the brooms can include circular brooms in some embodiments.

Like the example of the finishing devices 165 shown in FIGS. 2 and 3, the finishing devices 165 may extend outward until they come into contact with the surface of the median barrier 105. The brushes 168 may be employed to apply a coating, such as a paint or a liquid polymer that smooths, seals, or otherwise treats the median barrier 105, which may improve its aesthetic appearance or structural integrity. Alternatively, the brushes 168 may remove excess concrete, concrete dust, or other material from the median barrier 105.

Figure 5:
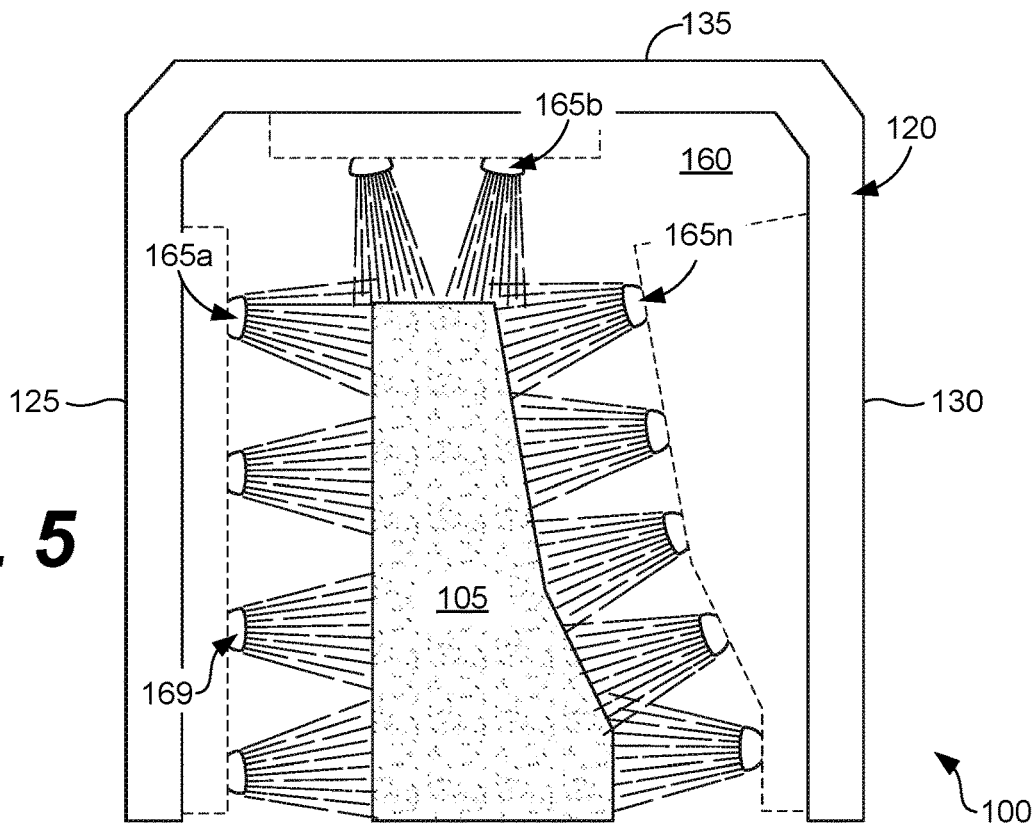
FIG. 5 is another side elevation view of an embodiment of a median barrier finishing machine according to various embodiments of the present disclosure.

Referring next to FIG. 5, another embodiment of the median barrier finishing machine 100 is shown comprising yet another example type of finishing devices 165. In various embodiments, the finishing devices 165 may include nozzles 169 or sprayers that may be coupled to an interior surface of the housing 120. For instance, to apply, spread, or spray a curing compound, a nozzle 169 or system of nozzles may be utilized in conjunction with or in place of brushes 168 or other spreading mechanism. The nozzles 169 may be configured to apply a liquid, foam, or other material to an outer surface of the median barrier 105, as shown in FIG. 5. For instance, the nozzles 169 may be configured to apply a liquid coating of a hardening compound, such as a paint or a polymer that smooths, seals, hardens, or otherwise treats the median barrier 105, which may improve its aesthetic appearance and/or structural integrity. Alternatively, the nozzles 169 may apply water, cleaning fluid, or other liquid that may remove excess concrete, concrete dust, or other material from the median barrier 105. The liquid or other material may be stored in a tank (not shown) coupled to the housing 120 or the vehicle 110. Further, a pump (not shown), such as an electromechanical pump, may be provided to supply the liquid from the tank to the nozzles 169.

Figure 6:
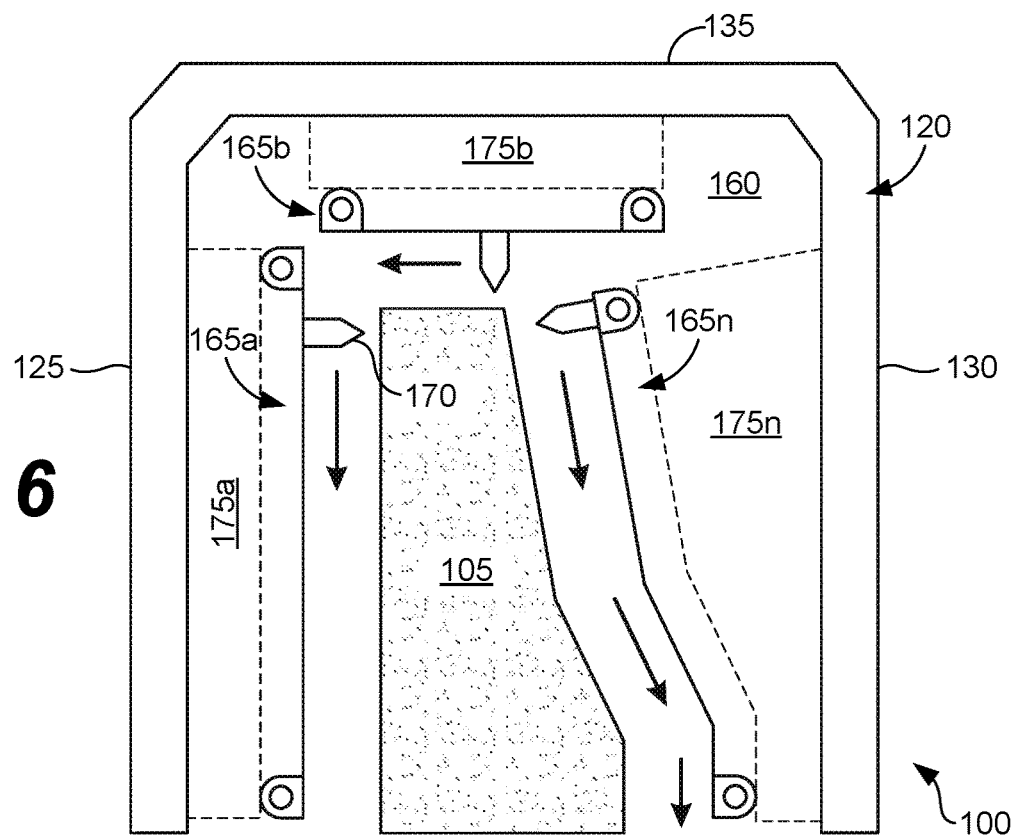
FIG. 6 is another side elevation view of an embodiment of a median barrier finishing machine according to various embodiments of the present disclosure.

Turning now to FIG. 6, another embodiment of the median barrier finishing machine 100 is shown comprising yet another example type of finishing devices 165. To cut, groove, or otherwise remove material to form a joint or groove in the surface of the concrete wall, a spade-type tool 170 may be utilized to trace a joint or a groove in the median barrier 105.

Accordingly, in various embodiments, the spade-type tool 170 may include blades or other cutting devices that may be coupled to an interior surface of the housing 120. The spade-type tool 170 may be configured to cut portions of the median barrier 105. For instance, the spade-type tool 170 may remove suitable portions of the median barrier 105 to make the median barrier 105 have a uniform shape or appearance along its length. Alternatively, the spade-type tool 170 may be employed to score, cut grooves, or form patterns in portions of the median barrier 105. For instance, the directional arrows in FIG. 6 illustrate the path the spade-type tool 170 or other cutting devices may take.

One or more substructures 175a . . . 175n (collectively "substructures 175") of the housing 120 may be used to hold, retain, or mount any tools, actuators, guiding members, capturing mechanisms, sensing or diagnostic devices or apparatus, power systems or cabling thereof, or any other infrastructure necessary to support tools. The substructure 175 may mount to the housing 120 through use of supporting members or linkages, fasteners, welds, or any other joining methods or processes.

In some embodiments, the substructures 175 may include actuators, where the actuators may include, for example, cylinders, springs, linkages, or other mechanisms, or a combination thereof. These may include gas struts, manual cranks, and similar devices. The actuators may also provide a pressure or a force to perform an operation or operations on a surface of the median barrier 105 with a tool or tool system, as will be described.

Figure 7:
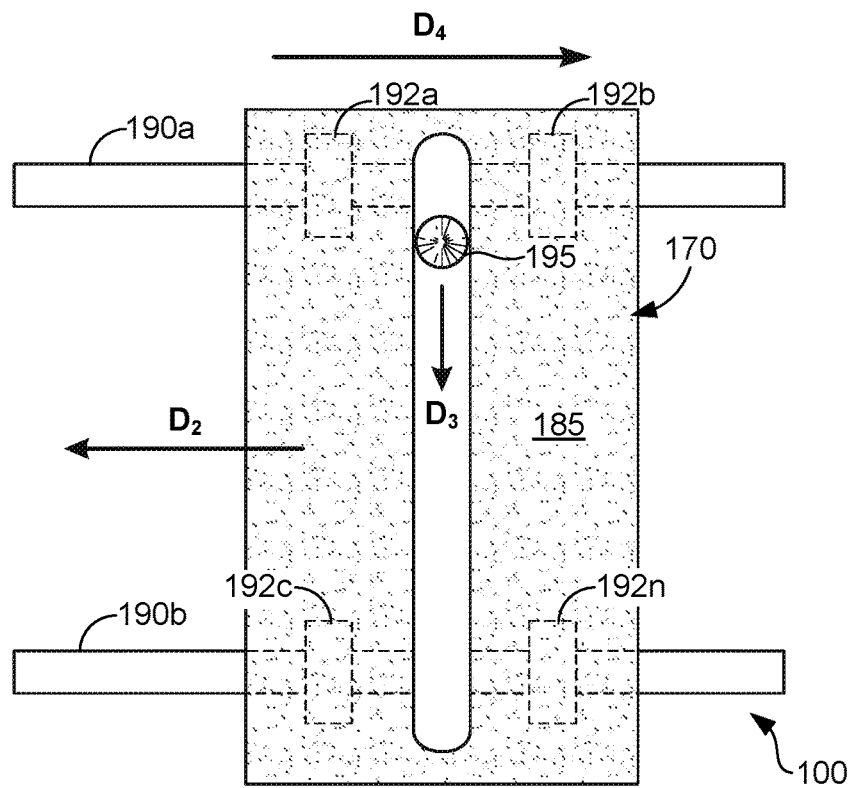
FIG. 7 is a top plan view of an embodiment of a median barrier finishing machine according to various embodiments of the present disclosure.

FIG. 7 is a top plan view of an embodiment of the median barrier finishing machine 100 according to various embodiments of the present disclosure. Specifically, FIG. 7 illustrates an embodiment that permits the median barrier finishing machine 100 to create vertical grooves in a surface of the median barrier 105, for instance, while the vehicle 110 is in a constant state of motion. As such, the median barrier machine 100 may include a grooving tool 180 in some embodiments.

The substructure 175 supporting the grooving tool 180 may contain a sled 185 mounted on rails 190a, 190b (collectively "rails 190"), bearings, or similar device. One or more linear actuators 192a . . . 192n (collectively "linear actuators 192"), cylinders, or other apparatuses may be used to move the sled 185 in reverse, denoted by direction $D_2$, so that a relative position of a spade tool 195, blade, or other cutting device to the median barrier 105 remains constant while a groove or cut is formed.

In some embodiments, the spade tool 195 may be of such geometry to groove walls with more than a single sloped face. The spade tool 195 may travel vertically, denoted by direction $D_3$ as the vehicle 110 is progressing forward (direction $D_4$) in some embodiments. To create a vertical line in the median barrier 105, a mechanism, such as the sled 185 and the rails 190, may be used to allow movement opposite the direction of travel of the vehicle 110 (direction $D_2$). This movement may be powered or manual (e.g., pushed by an operator) in various embodiments.

Figure 8:
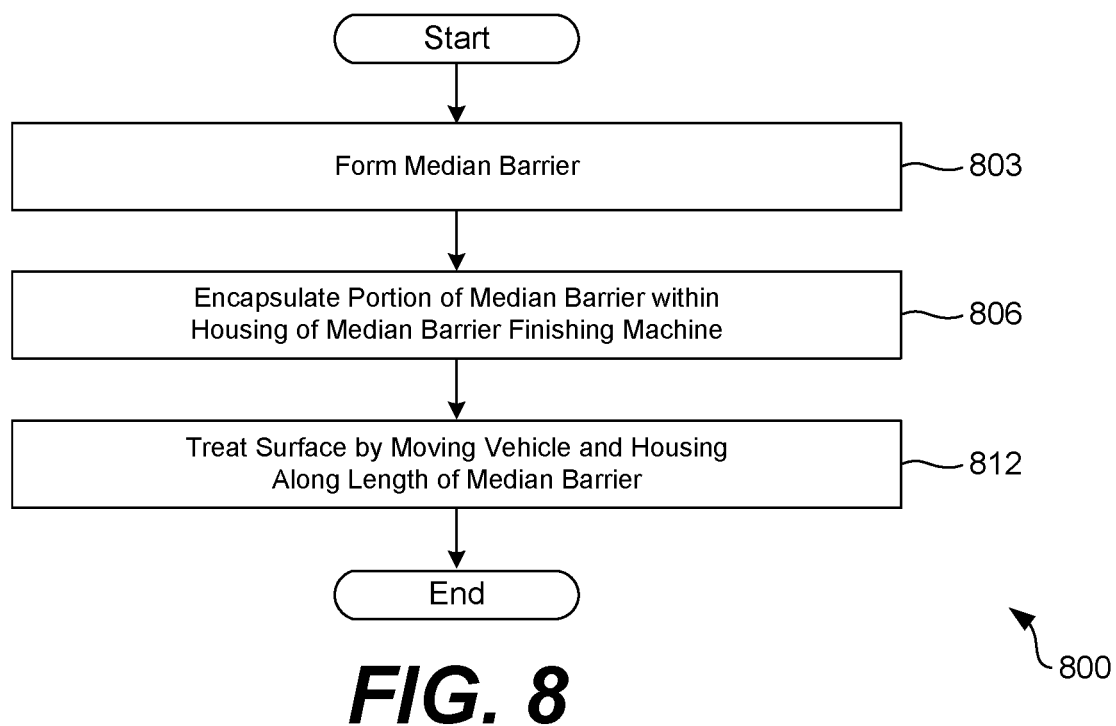
FIG. 8 is a flowchart describing an example operation of a median barrier finishing machine according to various embodiments of the present disclosure.

FIG. 8 is a flowchart 800 describing an example operation of a median barrier finishing machine 100 according to various embodiments of the present disclosure. It is understood that the flowchart of FIG. 8 provides merely an example of the many different types of arrangements that may be employed to use the median barrier finishing machine 100 in accordance with the various embodiments described herein. The steps of the flowchart 800 may be performed in an alternate sequence than that shown.

Beginning with step 803, a median barrier 105 may be formed, for instance, by stacking pre-formed concrete structures along one another. As may be appreciated, the median barrier 105 may include a wall positioned between a first side of a highway and a second side of the highway.

Next, in step 806, a portion of the median barrier 105 may be encapsulated within the housing 120 of the median barrier finishing machine 100. As noted above, the housing 120 may include a first vertical wall 125, a second vertical wall 130, and a horizontal wall 135, where the horizontal wall 135 couples the first vertical wall 125 to the second vertical wall 130.

In various embodiments, the housing 120 may be coupled to a vehicle 110 via one or more adjustable members 140. As noted above, the adjustable members 140 may be configured to retain the housing 120 a predetermined distance and a predetermined angle relative to the vehicle 110 or a ground surface, for instance, while the vehicle 110 is in motion. In alternative embodiments, the housing 120 may be permanently affixed to the vehicle 110 itself or a form of the vehicle 110.

Next, in step 812, a surface of the median barrier 105 may be treated, for instance, by moving the vehicle 110 and the housing 120 coupled thereto along a length of the median barrier 105, thereby causing at least one of the one or more finishing devices 165 disposed within the housing 120 to contact the surface of the median barrier 105 and treat the surface of the median barrier 105. As may be appreciated, the surface of the median barrier 105 is treated, for instance, as the vehicle 110 moves the housing 120 along the length of the median barrier 105 until a desired portion or an entirety of the median barrier 105 is treated.

Figure 9:
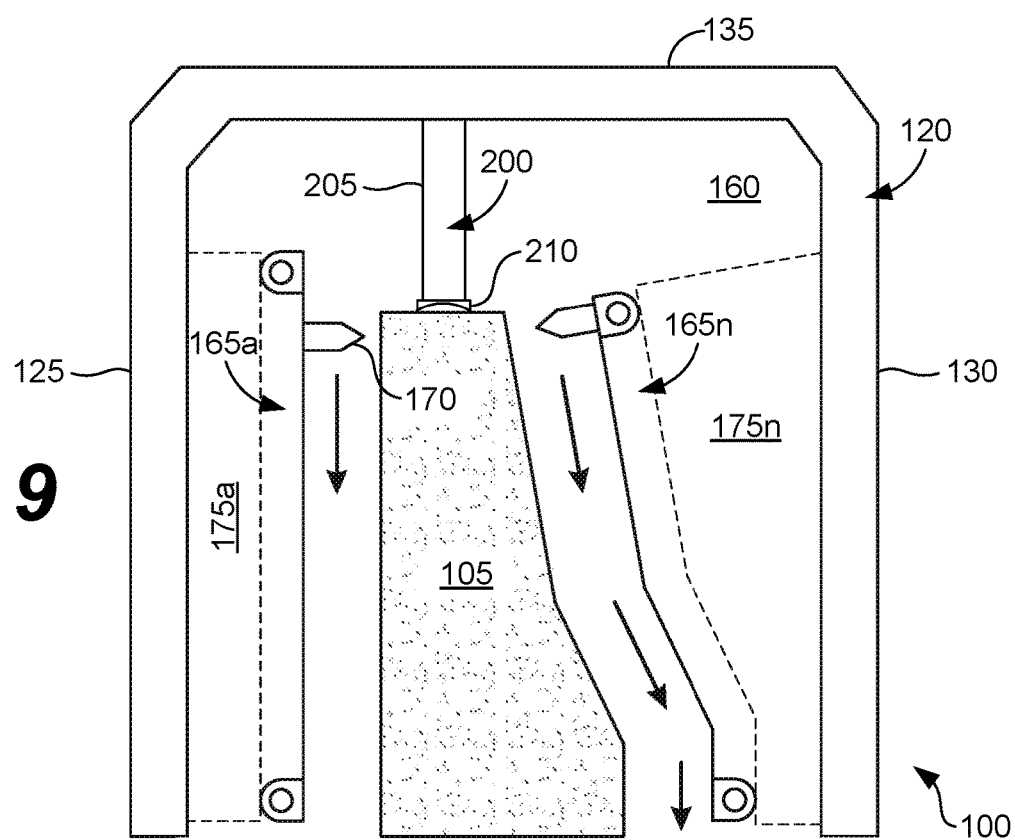
FIG. 9 is another side elevation view of an embodiment of a median barrier finishing machine according to various embodiments of the present disclosure.

Turning now to FIG. 9, another side elevation view of an embodiment of a median barrier finishing machine 100 is shown according to various embodiments of the present disclosure. The median barrier finishing machine 100 can include a load bearing device 200 which may come into contact with a top surface of the median barrier 105, for instance, to support a weight of the median barrier finishing machine 100. To this end, the load bearing device 200 can include a vertically-extending member 205 and a sled foot 210 is some embodiments. The sled foot 210, for instance, can include a low-friction surface that facilitates the load bearing device 200 sliding along the top surface of the median barrier 105 as the median barrier finishing machine 100 moves along a length of the median barrier 105. For instance, the sled foot 210 can include a curled front portion, similar to a sled or ski, that facilitates traversing a top surface of the median barrier 105. In addition to supporting some or all of the weight of the median barrier finishing machine 100, the load bearing device 200 may facilitate guiding the median barrier finishing machine 100 along a length of the median barrier 105.

While shown in FIG. 9 with a sled foot 210, in alternative embodiments, a bottom of the load bearing device 200 can include a wheel or other friction minimizing device. Also, while FIG. 9 depicts a single load bearing device 200, it is understood that multiple load bearing devices 200 may be employed. Further, finishing devices 165 can be positioned on an underside of the horizontal wall 135 on either side (or both sides) of the one or more load bearing devices 200.

Further, in various embodiments, the load bearing device 200 is a device distinct and separate from the median barrier finishing machine 100. In alternative embodiments, the load bearing device 200 is coupled to an underside of the horizontal wall 135 of the median barrier finishing machine 100 or is integrally formed with the median barrier finishing machine 100.

Figure 10:
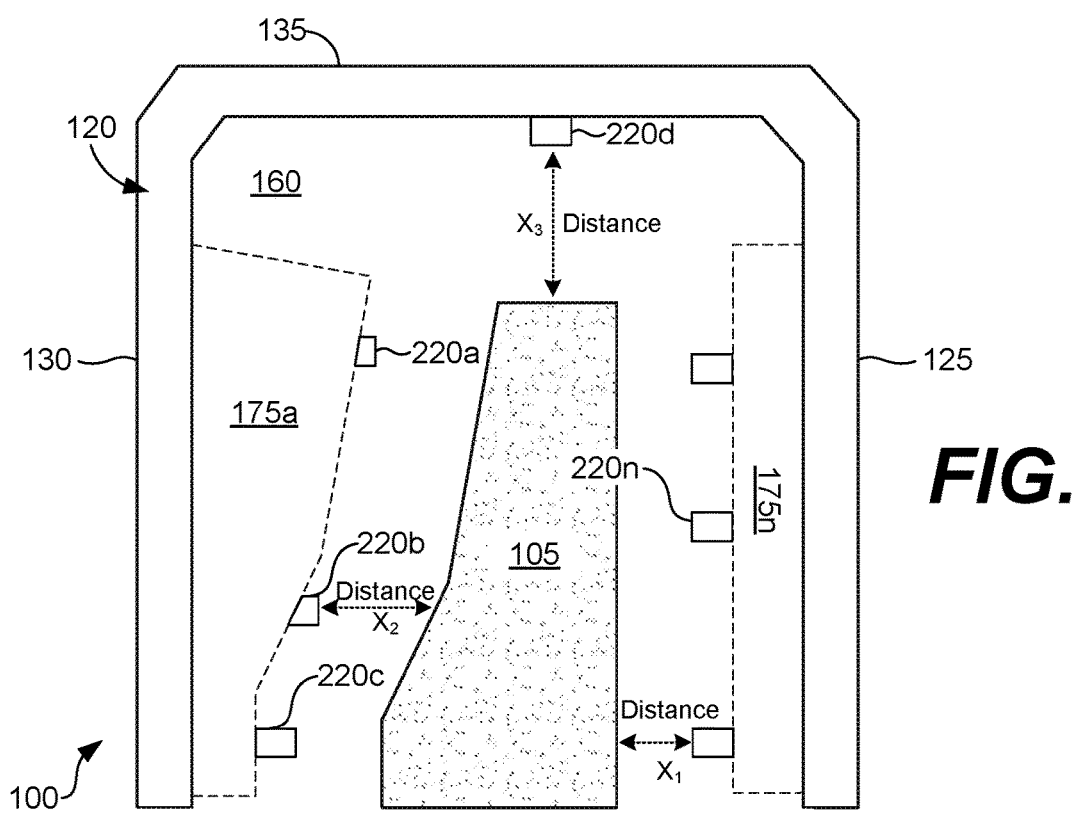
FIG. 10 is yet another side elevation view of an embodiment of a median barrier finishing machine according to various embodiments of the present disclosure.

Turning now to FIG. 10, another embodiment of the median barrier finishing machine 100 is shown. In various embodiments, the median barrier finishing machine 100 includes a plurality of sensors 220a . . . 220n (collectively "sensors 220") positioned on the underside of the housing 120. In some embodiments, at least a portion of the sensors 220 are proximity sensors or similar devices that measure a distance between the first vertical wall 125 and a first side of the median barrier 105 (e.g., distance $X_1$), a distance between the second vertical wall 130 and a second side of the median barrier 105 (e.g., distance $X_2$), and a distance between the horizontal member 135 and a top of the median barrier 105 (e.g., distance $X_3$). To this end, in some embodiments, the sensors 220 include radar sensors, contact switches, laser sensors, or other suitable sensor.

The sensors 220 may output a signal, such as a distance measurement, to a control circuit (not shown) that may be positioned within or near the median barrier finishing machine 100 or the vehicle 110. Based on the measurements obtained by the sensors 220, the control circuit may be used to adjust the predetermined distance $D_1$ and the predetermined angle α, for example, by communicating with an electrical or electromechanical controller, a hydraulic controller, a pneumatic controller, or other controller, as may be appreciated. In some embodiments, the control circuit may generate or maintain two-dimensional or three-dimensional reconstructions of the median barrier 105 to guide placement of the finishing devices 165 or an overall position of the housing 120.

The control circuit may include one or more microprocessors or other computing devices comprising, for instance, a hardware processor, a data bus, memory, and program instructions stored thereon that direct operation of the microprocessor or other computing device. In some embodiments, operation of the control circuit may be directed by a smartphone, a tablet, a laptop, a personal computer, a handheld controller integrated into controller of the vehicle 110, or other client device that may be configured to communicate with a controller of the adjustable members 140 wirelessly or through wired communications.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A median barrier finishing machine configured to attach to a vehicle, comprising:
    a housing configured to encapsulate at least a portion of a median barrier, wherein the housing comprises a first vertical wall, a second vertical wall, and a horizontal wall, wherein the horizontal wall couples the first vertical wall to the second vertical wall;
    at least one adjustable member configured to couple the housing to the vehicle and retain the housing a predetermined distance and a predetermined angle relative to the vehicle while the vehicle is in motion, wherein the at least one adjustable member is further configured to move at least one of: laterally, horizontally, and vertically with respect to a plane perpendicular to a profile of the median barrier; and
    at least one finishing device disposed within the housing, the at least one finishing device configured to contact a surface of the median barrier at least partially positioned within the housing and treat the surface of the median barrier as the vehicle moves the housing along a length of the median barrier, wherein the at least one finishing device comprises a roller, a sprayer, a heater, a blade, a sander, a concrete floater, a brush, a screed plate, a broom, or a combination thereof.

2. The median barrier finishing machine of claim 1, wherein the at least one finishing device is configured to perform at least one of: scraping the surface of the median barrier; floating the surface of the median barrier; smoothing the surface of the median barrier; cutting the surface of the median barrier; applying a texture or a pattern on the surface of the median barrier; spraying a compound on the surface of the median barrier; drying the media barrier; or applying heat to the median barrier.

3. The median barrier finishing machine of claim 2, wherein spraying a compound on the surface of the median barrier comprises spraying a hardening compound, a curing compound, or a protective compound on the surface of the median barrier.

4. The median barrier finishing machine of claim 1, wherein the at least one adjustable member is configured to move laterally, horizontally, or vertically through a mechanical system, an electrical system, a hydraulic system, or a combination thereof.

5. The median barrier finishing machine of claim 4, wherein the at least one adjustable member is one of a plurality of adjustable members.

6. The median barrier finishing machine of claim 5, wherein the plurality of adjustable members are adjusted using a control circuit.

7. A method, comprising:
    providing a median barrier finishing machine configured to attach to a vehicle, the median barrier finishing machine comprising:
        a housing configured to encapsulate at least a portion of a median barrier, wherein the housing comprises a first vertical wall, a second vertical wall, and a horizontal wall, wherein the horizontal wall couples the first vertical wall to the second vertical wall;
        at least one adjustable member configured to couple the housing to the vehicle and retain the housing a predetermined distance and a predetermined angle relative to the vehicle while the vehicle is in motion, wherein the at least one adjustable member is further configured to move at least one of: laterally, horizontally, and vertically with respect to a plane perpendicular to a profile of the median barrier; and at least one finishing device disposed within the housing, the at least one finishing device configured to contact a surface of the median barrier at least partially positioned within the housing and treat the surface of the median barrier as the vehicle moves the housing along a length of the median barrier, wherein the at least one finishing device comprises a roller, a sprayer, a heater, a blade, a sander, a concrete floater, a brush, a screed plate, a broom, or a combination thereof.

8. The method of claim 7, wherein the at least one adjustable member comprises at least one actuator and at least one guiding member.

9. The method of claim 7, wherein the at least one finishing device comprises at least one roller to apply a coating to smooth, seal, or otherwise treat the median barrier.

* * * * *